May 27, 1958     A. SALVO     2,836,496
METHOD OF COOKING POTATO CHIPS
Original Filed Dec. 7, 1951     3 Sheets-Sheet 1
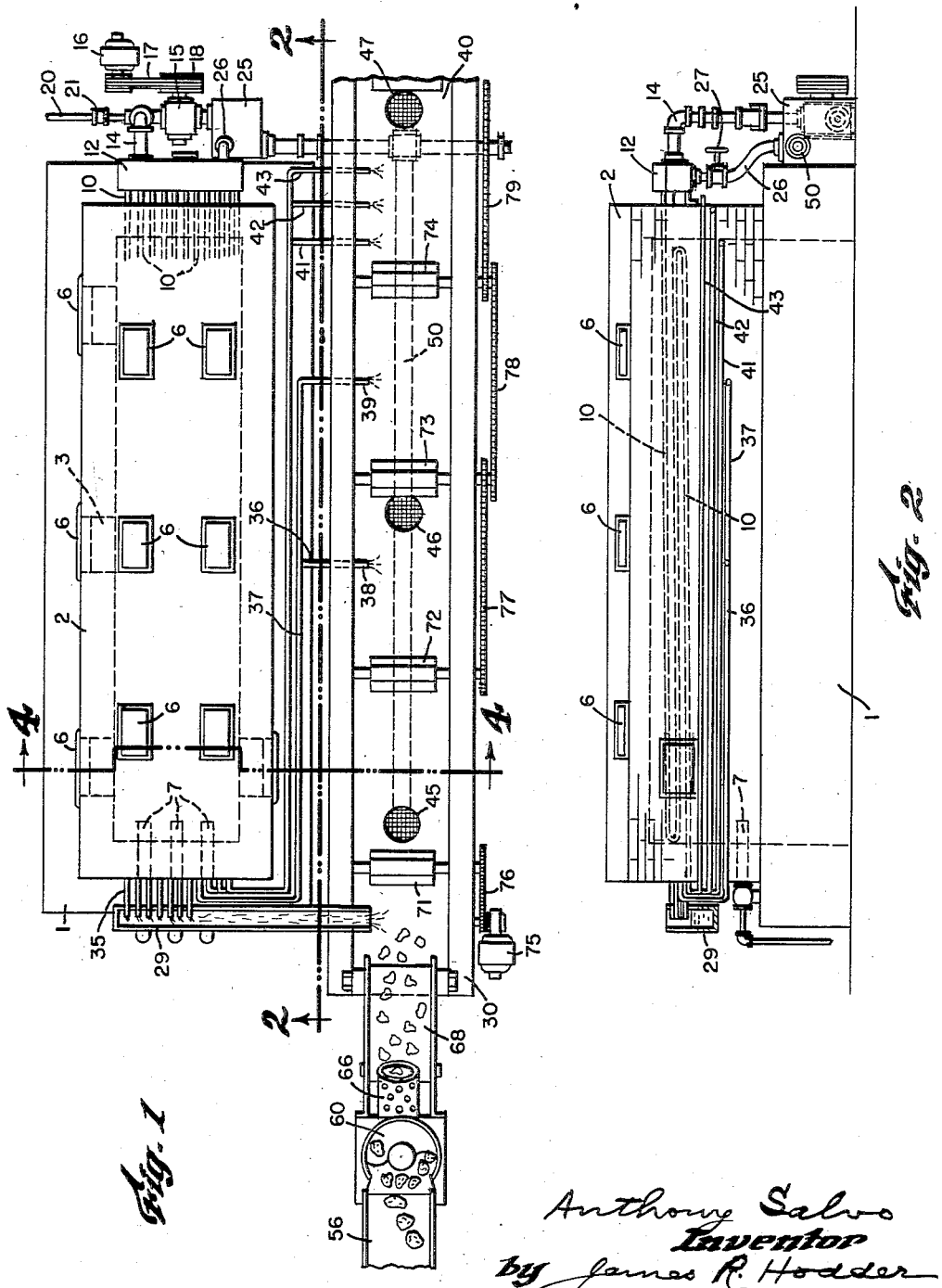

May 27, 1958 A. SALVO 2,836,496
METHOD OF COOKING POTATO CHIPS
Original Filed Dec. 7, 1951 3 Sheets-Sheet 2
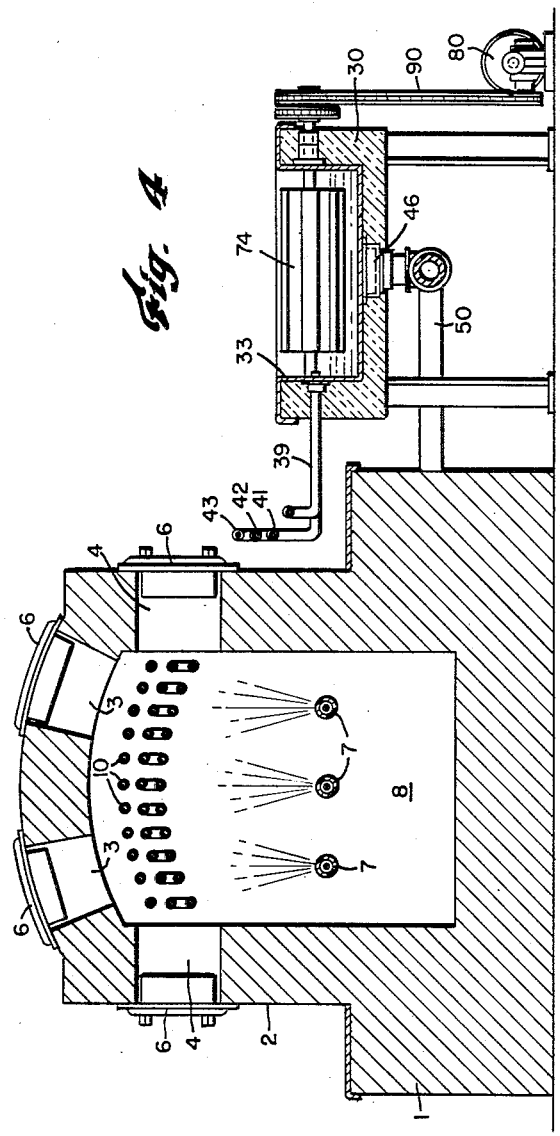
Anthony Salvo
Inventor
by James R. Hodder
Attorney May 27, 1958  A. SALVO  2,836,496
METHOD OF COOKING POTATO CHIPS
Original Filed Dec. 7, 1951  3 Sheets-Sheet 3

Anthony Salvo
Inventor
by James R. Hodder
Attorney

United States Patent Office 2,836,496
Patented May 27, 1958

2,836,496

METHOD OF COOKING POTATO CHIPS

Anthony Salvo, Fall River, Mass.

Original application December 7, 1951, Serial No. 260,376, now Patent No. 2,715,869, dated August 23, 1955. Divided and this application July 7, 1955, Serial No. 520,413

1 Claim. (Cl. 99—100)

My present invention is a novel and improved method of manufacturing food products, including the handling and cooking of the same, and is directed particularly to my method of making potato chips and the like, and is a division of my prior and copending application Ser. No. 260,376, filed December 7, 1951, on an Improved Machine for Potato Chip Manufacture, allowed April 14, 1955, and now Patent No. 2,715,869, dated August 23, 1955.

As explained in my said prior application, important objects of my present improved invention and process as carried out by my novel machine of said prior application, are to insure a uniformly cooked product; to effect a saving in the oil employed in the cooking action, and thereby utilizing a better grade of oil; to separate the heating of the oil and the cooking instrumentalities in adjacent but spaced relation; to supply heated oil at predetermined positions in the cooker; to withdraw partially cooled oil from the bottom of the cooker, and thus affording a regulated heat supply while feeding the articles being cooked throughout the length of the cooker; to maintain the devices being cooked at a predetermined submerged level in the cooking oil, and for other improvements.

Referring to the drawings illustrating preferred embodiments:

Fig. 1 is a plan view of my improved apparatus to carry out my novel process;

Fig. 2 is a side view of the heater, viewing the same on the line 2—2 of Fig. 1, looking in the direction of the arrows;

Fig. 3 is a side elevational view of the apparatus;

Fig. 4 is an enlarged cross-sectional view on the line 4—4 of Fig. 1;

Figure 5:
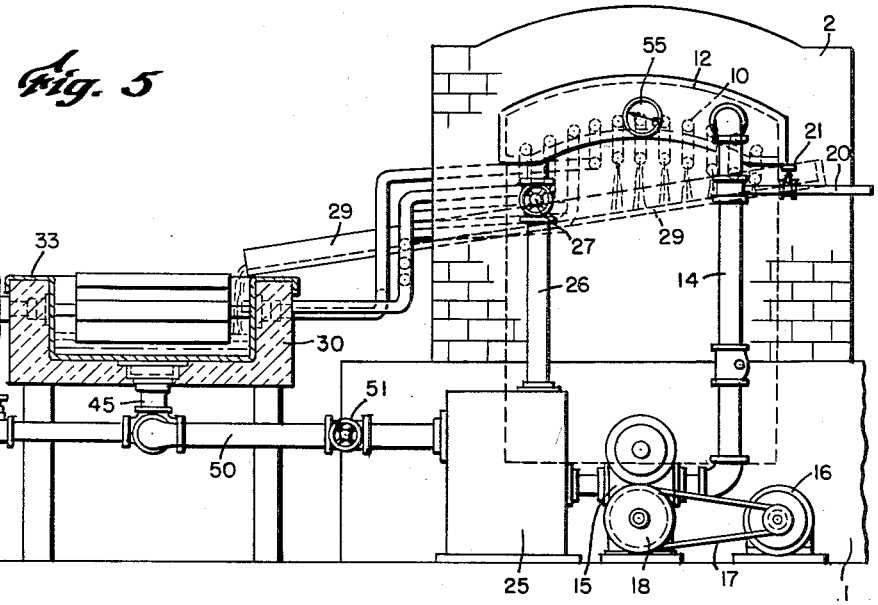
Fig. 5 is an end view looking from the right of Fig. 1.

As shown in the drawings, 1 indicates a brick-enclosed heater having an upper extension 2, wherein are a plurality of open hatchways 3—3 along the top and 4—4 at the sides to permit access for cleaning and to provide a plurality of openings to dissipate the heat when the fire is shut off, enclosed by removable covers 6—6. A series of burners 7—7, preferably oil or gas, are fitted at one end in the firing chamber 8; and along the upper part of the heater are sets of oil-carrying tubes 10—10, preferably extending lengthwise of the heater, and returning to give a double or tripled transmission of the oil to be heated flowing thru the tubes.

Said tubes are led in from a manifold 12, into which oil is supplied under pressure thru a conduit 14 from a pump 15, actuated by a motor 16 thru a belt 17 to a pulley 18, as best shown in Figs. 1 and 5. New oil may be admitted in any suitable way, but as here shown I provide a pipe 20 from any suitable source of supply regulated by a valve 21. The pump 15 is arranged to draw a supply of oil from a filtering sump 25 into which the oil is returned after passing thru a cooker and thence thru a filter in the sump 25.

I also provide a by-pass 26 controlled by a valve 27 extending from the manifold 12 into the sump 25 so that the pump can be operating at normal speed, keeping the oil in forced circulation thru the manifold 12 and the series of tubes 10. These tubes extend in doubled relation and preferably incline downwardly at an angle to facilitate cleaning and are lead lengthwise of the fire box 8, and a plurality of these tubes deliver the heated oil at the opposite end into a trough 29, which, in turn, delivers the heated oil into the end of the cooker 30.

This cooker or kettle 30 is preferably arranged in close proximity to and parallel with the heater 1 and lined with aluminum 33, this material being found satisfactory to keep the heated oil in condition and prevent tarnishing and discoloring.

It will be appreciated that as the sliced potatoes are delivered at the intake end of the cooker 30, they are in a cold condition and in order to take care of this situation I direct a considerable number of the tubes 10 carrying the heated oil from the boiler to the cooker sufficient to compensate for the initial carrying of the potato slices thus delivered. Any desired number of the tubes 10 can be directed to the intake end of the cooker.

As here shown, a series of such tubes, indicated generally at 35, may be led directly into the cooker or thru a trough 29, which may be insulated and covered, but I prefer to lead a selected number of the oil-carrying tubes to provide fresh and heated oil lengthwise of the cooker so as to maintain the proper temperature, viz., approximately 340° to 360° F. throughout the cooker. By this means, also I may control the temperature lengthwise of the cooker 30, as may be found expedient.

I have herein illustrated a set of the tubes 36 and 37, discharging into the cooker midway of the length, as indicated at 38 and 39, respectively, with the further set of the tubes led adjacent the outgoing or delivery end 40 of the cooker 30, as indicated at 41, 42, and 43 to discharge the heated oil at the delivery end. It will be appreciated that the heated oil being positively circulated into and thru the cooker at these various points of delivery will cause a continuous flow and thus maintain the oil in proper condition.

To stil further control the heat supply and condition, I provide a series of drains in the bottom of the cooker, as indicated at 45, 46, and 47 to withdraw the partially cooled oil at the bottom of the cooker and lead same thru a conduit 50, controlled by a valve 51, back into the filter and sump 25.

I contemplate utilizing any suitable or desired automatic controls to govern the heat thru the burner 7 which may be regulated by temperature or pressure, as indicated by a dial 55, or otherwise, so as to keep the flow of heated oil from the boiler to the cooker at the critical temperature desired. In addition, the customary or usual safety devices to shut off the fuel thru the burners 7 will also be utilized.

In order to supply the sliced potatoes in desired quantity to the cooker, I contemplate utilizing any suitable potato peeler adjacent the feeding end of the cooker 30, wherein the same are led by a chute 56 from the peeler into a suitable slicer 60 which automatically slices the potatoes; and as the same are dropped from the slicer 60, I provide a spray-washing apparatus, as indicated at 61, Fig. 3, wherein water under pressure from any suitable source is supplied thru a pipe and into a spraying nozzle in the path of the sliced potatoes as they drop from the slicer 60 into a receptacle 63 from whence they are delivered into my novel combined screening, drying, and feeding device 66.

This is a perforated rotatable cylindrical screen having a spiral rubber feeding rib, or ribs, indicated in dotted lines at 67, Fig. 3, which screen is rotated in any suitable manner and permits the sliced potatoes to be dried as they are fed to a conveyor 68, leading the sliced potatoes directly into the delivery end of the cooker 30. From thence, the sliced potatoes, which normally flow on the surface of the heated oil 70, may be moved lengthwise of the tank by a series of usual type of paddles 71, 72, 73, and 74. These paddles are generated in the sides of the top of the cooker 30 and the first paddles 71 rotated by a motor 75 and sprocket chains 76, the other paddles being similarly rotated by connecting sprocket chains 77, 78, and 79 from a motor 80, or in any other suitable or usual manner as shown in the drawings.

Figure 6:
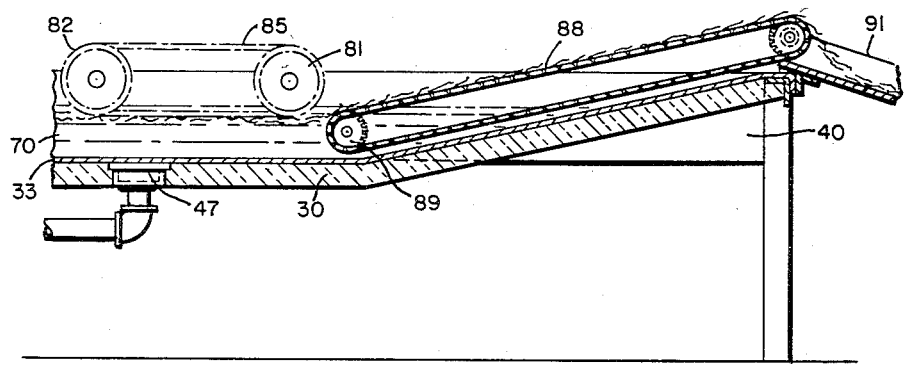
Fig. 6 is an enlarged cross-sectional view of a modification showing the means for feeding the sliced potatoes while immersed in the cooking oil.

Instead of the paddles 71, 72, 73, 74 or any combination of the same, I prefer to utilize a mesh chain conveying element, as shown in Fig. 6, which will hold the floating sliced potatoes underneath the surface of the oil level, preferably at a predetermined depth, and preferably also near the delivery end 40 of the kettle 30.

For this purpose I provide a pair of sprockets indicated at 81 and 82 over which an openwork mesh chain element, the full width of the interior of the cooker, is rotated, said mesh belt or chain 85 acting on top of the floating sliced potatoes as they approach the delivery end of the cooker, thereby depressing them a predetermined depth below the level, thus insuring full and complete cooking of the entire mass of sliced potatoes being fed thru the cooker.

This feature is of special importance and a distinct novelty in this art and overcomes the difficulty heretofore found with the use of paddles, which latter tended to raise the sliced potatoes, lifting them or a part of them out of the cooking oil and, hence, apt to cause a variation in the resultant potato chips, some being overcooked and some being undercooked. By my method of positively submerging the sliced potatoes, either at a portion or throughout the entire extent of their travel in the cooker, I secure a positive and more uniform cooking action. This openwork chain belt 85 may be operated at any speed desired and the sprockets actuated by a belt connection with either of the motors already indicated, or from a separate motor if desired.

At the delivery end 40 of the tank a conveyor 88 of usual type operated between sprockets 89 and connected with the motor 80 by the belt 90, which may also be utilized to rotate the sprocket chain 79 and the paddles, is arranged whereby the now cooked potato chips are delivered into a trough 91 and thence to the usual sorting and packaging stations.

It will be appreciated that my novel and improved apparatus for the automatic manufacture of potato chips, or the like, utilizing heated oil as the cooking element, carries out my novel process of heating the oil remote from the cooker or kettle, preventing the oil in the kettle from becoming overheated at the bottom, insuring the maintenance of the oil in proper condition, permitting it to be re-used—instead of as formerly being thrown away at the end of each day's work.

Also, by having the cooking kettle spaced, protected, and remoted from the fire, the danger and hazard of getting the oil either overheated or catching on fire is prevented.

I claim:

In the continuous cooking of potato chips, the steps of heating a body of oil to a cooking temperature in a zone remote from a cooking zone, continuously delivering said heated oil to said cooking zone at a plurality of points spaced along the upper portion of said cooking zone, continuously advancing potato chips through said heated oil in said cooking zone to be cooked solely by contact with said pre-heated oil, while continuously recirculating said oil from the cooking zone to the heating zone remote from said cooking zone and back to said cooking zone.

References Cited in the file of this patent

UNITED STATES PATENTS

| | | |
|---|---|---|
| 1,234,131 | Cleveland | July 24, 1917 |
| 2,041,175 | Goodman | May 19, 1936 |
| 2,286,644 | Pringle et al. | June 16, 1942 |
| 2,463,112 | Kipnis | Mar. 1, 1949 |